United States Patent
Sekiguchi et al.

(10) Patent No.: US 7,972,694 B2
(45) Date of Patent: Jul. 5, 2011

(54) TRIPLE-LAYER SEMICONDUCTOR NANOPARTICLE AND TRIPLE-LAYER SEMICONDUCTOR NANOROD

(75) Inventors: Mitsuru Sekiguchi, Tokyo (JP); Kazuya Tsukada, Tokyo (JP); Hisatake Okada, Tokyo (JP)

(73) Assignee: Konica Minolta Medical & Graphic, Inc. (JP)

( * ) Notice: Subject to any disclaimer, the term of this patent is extended or adjusted under 35 U.S.C. 154(b) by 371 days.

(21) Appl. No.: 12/162,164

(22) PCT Filed: Nov. 27, 2006

(86) PCT No.: PCT/JP2006/323559
§ 371 (c)(1),
(2), (4) Date: Jul. 25, 2008

(87) PCT Pub. No.: WO2007/086188
PCT Pub. Date: Aug. 2, 2007

(65) Prior Publication Data
US 2009/0053522 A1    Feb. 26, 2009

(30) Foreign Application Priority Data
Jan. 30, 2006   (JP) ................. 2006-021390

(51) Int. Cl.
*B32B 5/16* (2006.01)
(52) U.S. Cl. ........ 428/403; 428/212; 977/774; 977/813; 977/815; 977/825; 977/832
(58) Field of Classification Search .................. 428/403, 428/212; 977/774, 813, 815, 825, 832
See application file for complete search history.

(56) References Cited

U.S. PATENT DOCUMENTS

| | | | | |
|---|---|---|---|---|
| 7,200,318 B2 * | 4/2007 | Banin et al. | .......... | 385/147 |
| 7,390,568 B2 * | 6/2008 | Kim et al. | .......... | 428/403 |
| 7,431,867 B2 * | 10/2008 | Okada et al. | .......... | 252/500 |
| 7,534,488 B2 * | 5/2009 | Alivisatos et al. | .......... | 428/402 |
| 2005/0002635 A1 * | 1/2005 | Banin et al. | .......... | 385/147 |
| 2009/0230382 A1 * | 9/2009 | Banin et al. | .......... | 257/14 |
| 2009/0236563 A1 * | 9/2009 | Goan et al. | .......... | 252/500 |
| 2010/0096599 A1 * | 4/2010 | Goan et al. | .......... | 252/519.4 |

FOREIGN PATENT DOCUMENTS

| JP | 2002-121549 A | 4/2002 |
|---|---|---|
| JP | 2002-283768 A | 10/2002 |
| JP | 2005-306533 A | 11/2005 |
| JP | 2007-279550 A | 10/2007 |
| JP | 2005-172429 A | 7/2008 |

OTHER PUBLICATIONS

Lattice Constants (siliconfareast.com), 2004.*

(Continued)

*Primary Examiner* — H. (Holly) T Le
(74) *Attorney, Agent, or Firm* — Cantor Colburn LLP

(57) ABSTRACT

A semiconductor nanoparticle and semiconductor nanorod that have optical characteristics (luminescence intensity and emission lifetime) superior to those of conventional core/shell nanosized semiconductors. There are provided a triple-layer semiconductor nanoparticle, and triple-layer semiconductor nanorod, having an average particle diameter of 2 to 50 nm and comprising a core layer, an interlayer and a shell layer, wherein the layers are composed of different crystals, and wherein the crystal constructing the shell layer exhibits a band gap greater than that of the crystal constructing the core layer, and wherein the crystal constructing the interlayer has a lattice constant assuming a value between those of the crystal constructing the core layer and the crystal constructing the shell layer.

12 Claims, 2 Drawing Sheets

OTHER PUBLICATIONS

Properties of the II-VI compound semiconductors, 1999.*
International Search Report for International Application No. PCT/JP2006/323559 mailed Mar. 6, 2007.

Office Action for Japanese Patent Application No. 2007-281481 mailed Sep. 29, 2009 with English translation.

* cited by examiner

TRIPLE-LAYER SEMICONDUCTOR NANOPARTICLE AND TRIPLE-LAYER SEMICONDUCTOR NANOROD

TECHNICAL FIELD

The present invention relates to triple-layer nanoparticles and triple-layer nanorods.

TECHNICAL FIELD

It is known that nano-sized semiconductors such as semiconductor nanoparticles or semiconductor nanorods displays, which are nanosized, display quantum size effects such as an increase of band gap energy or the confinement effect of exciton, and exhibiting optical characteristics, for example, favorable light absorption characteristic and emission property. Recently, studies on nanosized semiconductors have been actively reported and there have also been promoted studies on various applications as a phosphor for displays, biomedical or optical communication elements.

For instance, there has been studied a biomaterial labeling agent in which an organic molecule is attached to the surface of a $Si/SiO_2$ type semiconductor nanoparticle as a core/shell type semiconductor nanoparticle (as described in, for example, patent document 1).

Patent document 1: JP 2005-172429A

DISCLOSURE OF THE INVENTION

Problem to be Solved

Conventional core/shell type nanosized semiconductors have not yet achieved the superior optical characteristic which was inherent to the core layer, Accordingly, it is an object to provide semiconductor nanoparticles and semiconductor nanorods which exhibit optical characteristics superior to those of conventional core/shell type nanosized semiconductors.

Means for Solving the Problem

Extensive study by the inventors of this application has found that a triple-layer semiconductor nanoparticle and a triple-layer semiconductor nanorod, comprising a core, an intermediate layer and a shell layer and formed of a specific crystal, exhibit superior optical characteristics, achieving the present invention.

Thus, the present invention is directed to triple-layered semiconductor nanoparticles, each comprising a core layer, an intermediate layer and a shell layer and having an average particle diameter of 2 to 50 nm, each of the foregoing layers being formed of different crystals, a crystal forming the shell layer having a band gap greater than that of a crystal forming the core layer, and a lattice constant of a crystal forming the intermediate layer being a value between a lattice constant of the crystal forming the core layer and that of the crystal forming the shell layer.

The invention is also directed to triple-layered semiconductor nanorods, each comprising a core layer, an intermediate layer and a shell layer and having an average particle diameter of 2 to 50 nm, each of the foregoing layers being formed of different crystals, a crystal forming the shell layer having a band gap greater than that of a crystal forming the core layer, and a lattice constant of a crystal forming the intermediate layer being a value between a lattice constant of the crystal forming the core layer and that of the crystal forming the shell layer.

In the foregoing triple-layered semiconductor nanoparticles or triple-layered semiconductor nanorods, when the composition of the crystal forming the core layer is represented by AB and the composition of the crystal forming the shell layer is represented by CB, the composition of the crystal forming the intermediate layer may be represented by $A_xC_{1-x}B$ (wherein A, B and C are elements which are different from each other; and X is a value falling within the range of $0<X<1$).

Specifically, when the composition of a crystal forming the core layer is represented by GaAs and the composition of a crystal forming the shell layer is represented by AlAs, the composition of a crystal forming the intermediate layer may be $Ga_{0.5}Al_{0.5}As$. When the composition of a crystal forming the core layer is represented by GaN and the composition of a crystal forming the shell layer is represented by AlP, the composition of a crystal forming the intermediate layer may be $Ga_{0.5}Al_{0.5}N$ When the composition of a crystal forming the core layer is represented by GaP and the composition of a crystal forming the shell layer is represented by AlP, the composition of a crystal forming the intermediate layer may be $Ga_{0.5}Al_{0.5}P$. When the composition of a crystal forming the core layer is represented by GaSb and the composition of a crystal forming the shell layer is represented by AlSb, the composition of a crystal forming the intermediate layer may be $Ga_{0.5}Al_{0.5}Sb$.

The difference between the lattice constant of a crystal forming the core layer and that of a crystal forming the shell layer is preferably not more than 3%.

EFFECT OF THE INVENTION

The triple-layered semiconductor nanoparticles or triple-layered semiconductor nanorods of the invention exhibit superior emission characteristics such as enhanced emission efficiency and longer life of continuous emission.

DESCRIPTION OF DESIGNATION

Figure 1:
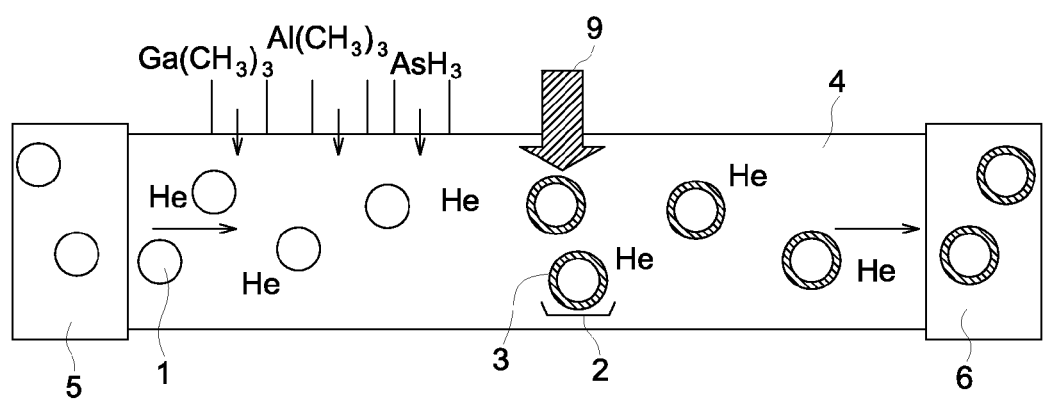
FIG. 1 illustrates the process of preparing $Ga/As/Ga_{0.5}Al_{0.5}As/AlAs$ nanoparticles.
Figure 1:
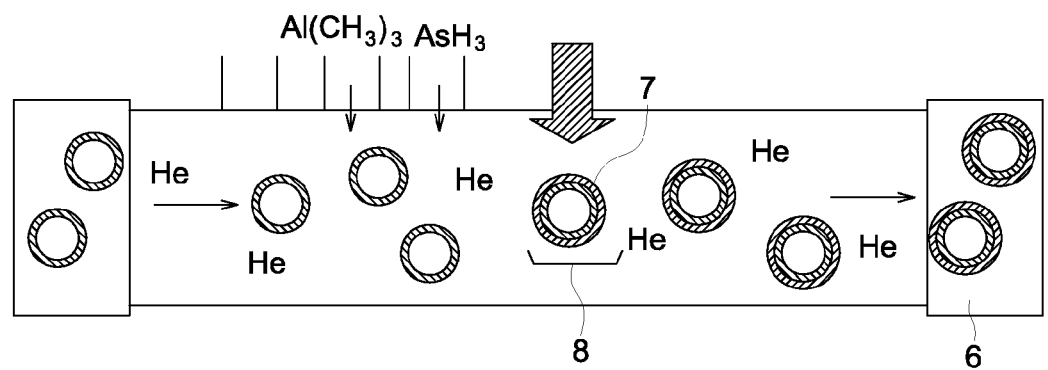

1: GaAs nanoparticle
2: $GaAs/Ga_{0.5}Al_{0.5}As$ nanoparticle
3: $Ga_{0.5}Al_{0.5}As$ layer
4: Reaction chamber
5: Vaporizer
6: Collector
7: AlAs layer
8: $GaAs/Ga_{0.5}Al_{0.5}As/AlAs$ nanoparticle
9: Laser light
21: Si substrate
22: $SiO_2$
23: Ga
24: Au nanoparticle
25: GaN core
26: GaN nanowire
27: $Ga_{0.5}Al_{0.5}N$ layer
28: $GaN/Ga_{0.5}Al_{0.5}N$ nanowire

29: AlN layer
30: GaN/Ga$_{0.5}$Al$_{0.5}$N/AlN nanowire

PREFERRED EMBODIMENT OF THE INVENTION

The invention will be specifically described as below.

In the invention, the triple-layered semiconductor nanoparticle is nearly in a spherical form, while the triple-layered semiconductor nanorod is in a cylindrical form inclusive of a nanowire structure having a length of a maximum of a few tens of μm.

In the invention, the crystal lattice constant refers to the length of an edge of the lattice, and when edges differing in length exist, it refers to the average value of the individual edge lengths.

In the invention, the crystal lattice constant refers to a value described in K Uenishi "Denshi Device Zairyo" (Electronic Device material) Nippon Riko Shupan-kai (2002) page 62-63.

The crystal band gap refers to a value described in K. Uenishi "Denshi Device Zairyo" Nippon Riko Shupan-kai (2002) or H. Kobayashi "Hakko no Butsuri" (Physics of Emission), Asakura-shoten (2000) page 108.

Triple-Layered Semiconductor Nanoparticle

The triple-layered semiconductor nanoparticles of the invention have a structure comprised of a core layer and a shell layer, provided therebetween with an intermediate layer. The average particle diameter of the triple-layer semiconductor nanoparticles is within the range of 2 to 50 nm, and preferably within the range of 2 to 10 nm. Falling above the lower limit of the foregoing range forms a structure of atoms being assembled, causing a band gap; falling below the upper limit of the range results in abruptly enhanced emission efficiency due to the confinement effect of an exciton (a pair of an electron and a hole).

The core layer, the shell layer and the intermediate layer are formed of different crystals. Such crystals are chosen so that the band gap of a crystal which forms the shell layer is greater than that of a crystal which forms the core layer. Examples of such a core/shell include GaAs/AlAs, GaN/AlN and GaP/AlP.

The lattice constant of a crystal forming an intermediate layer preferably is a value between the lattice constant of a crystal forming a core layer and that of a crystal forming a shell layer.

The triple-layer semiconductor nanoparticles of the invention are featured in enhanced emission efficiency and longer life on continuous emission, compared to conventional core/shell type semiconductor nanoparticles.

The reason therefor is not clear but it is presumed that providing an intermediate layer having a lattice constant between core and shell layers results in enhanced compatibility of lattices, leading to the tendency of reduced lattice defects, whereby emission characteristics inherent to nanoparticles are fully realized.

As a preferred embodiment of the triple-layered semiconductor nanoparticles of the invention which meet the foregoing requirements are cited the following three embodiments.

In the triple-layered semiconductor nanoparticles of the invention, the core layer is preferably formed of a crystal of composition AB, the shell layer is preferably formed of a crystal of composition CB and the intermediate layer is preferably formed of a crystal of composition $A_xC_{1-x}B$ (wherein A, B and C are each an element and x is a value falling within the range of 0<x<1).

When the core layer is formed of a crystal of composition AB and the shell layer is formed of a crystal of a composition CB, the use of a crystal of composition $A_xC_{1-x}B$ for a crystal to form the intermediate layer results in enhanced lattice compatibility and improved tendency of reduced lattice defects, realizing superior optical characteristics. Examples of such a composition for the intermediate layer include $Ga_xAl_{1-x}$ for a core/shell of GaAs/AlAs, $Ga_xAl_{1-x}$ for a core/shell of GaN/AlN, $Ga_xAl_{1-x}P$ for a core/shell of GaP/AlP, and $Ga_xAl_{1-x}P$ for a core/shell of GaSb/AlSb. Specifically, when x=0.5, an intermediate layer of an intermediate lattice between a lattice of AB and a lattice of CB is formed, which can reduce most lattice defects, so that an intermediate layer of $Ga_{0.5}Al_{0.5}As$ is preferred for a core/shell of GaAs/AlAs, that of $Ga_{0.5}Al_{0.5}N$ is preferred for a core/shell of GaN/AlN, that of $Ga_{0.5}Al_{0.5}P$ is preferred for a core/shell of GaP/AlP, and that of $Ga_{0.5}Al_{0.5}Sb$ is preferred for a core/shell of GaSb/AlSb. In these examples, crystals forming the core layer, the shell layer and the intermediate layer are of the same crystal system.

In the triple-layered semiconductor nanoparticles of the invention, crystals forming a core layer, a shell layer and an intermediate layer are preferably of the same crystal system in terms of realization of the superior optical characteristics. Preferred examples of core/intermediate layer/shell include GaAs/Ga$_x$Al$_{1-x}$As/AlAs, GaN/Ga$_x$Al$_{1-x}$N/AlN, GaP/Ga$_x$Al$_{1-x}$P/AlP, and GaSb/Ga$_x$Al$_{1-x}$Sb/AlSb.

In the triple-layered semiconductor nanoparticles of the invention preferably, the difference in lattice constant between a core-forming crystal and a shell-forming crystal is preferably not more than 3% to achieve the superior optical characteristics.

When there are used such crystals of the difference in lattice constant between a core-forming crystal and a shell-forming crystal being not more than 3%, the interface of the crystals easily grows epitaxially to result in reduced lattice defects, realizing reduced lattice defects on the interface. For example, when the core/shell is GaAs/AlAs of a ZnS structure, the lattice constant is to be 5.65/5.63 Å; when core/shell is GaP/AlP, the lattice constant is to be 5.45/5.46 Å; and when core/shell is GaSb/AlSb, the lattice constant is to be 6.08/6.14 Å.

When simultaneously satisfying the foregoing preferred embodiments, for example, the core/intermediate layer/shell of GaAs/Ga$_{0.5}$Al$_{0.5}$As/AlAs, GaP/Ga$_{0.5}$Al$_{0.5}$P/AlP or GaSb/Ga$_{0.5}$Al$_{0.5}$Sb/AlSb tends to be lowered in lattice defect, resulting in an increase in emission intensity and emission life.

The emission wavelength of the triple-layered nanoparticles of the invention depends on its composition and particle size. For example, a core of GaN exhibits emission wavelengths having a peak at a wavelength of 370-180 nm on the assumption of no energy loss in the emission process; a core of GaAs exhibits emission wavelengths having a peak at a wavelength of 870-430 nm on the assumption of no energy loss in the emission process; a core of GaP exhibits emission wavelengths having a peak at a wavelength of 550-270 nm on the assumption of no energy loss in the emission process; and a core of GaSb exhibits emission wavelengths having a peak at a wavelength of 1770-890 nm on the assumption of no energy loss in the emission process.

As is emitted at the foregoing wavelengths, a core of GaN is applicable to a violet emission device or emission labeling, and specifically to a therapy for the affected area by exposure to UV emission; a core of GaAs, which emits in the region of red to violet and can cover all of the three emissions of red, green and blue, is usable for displays and the like; a core of GaP is applicable to a violet emission device or emission labeling, and specifically to therapy for the affected area by exposure to UV emission; and a core of GaSb emits infrared light which can easily transmit through the human body, is usable for labeling for physiological diagnosis.

Preparation of Triple-Layered Semiconductor Nanoparticle

Triple-layered semiconductor nanoparticles of core/intermediate layer/shell, for example, GaAs/Ga$_{0.5}$Al$_{0.5}$As/AlAs is prepared in the manner as follows. GaAs nanoparticles as a core are synthesized through gas phase growth, then, a Ga$_{0.5}$Al$_{0.5}$As intermediate layer of a few atom thickness is formed by using Al(CH$_3$)$_3$, Ga(CH$_3$)$_3$ and AsH$_3$ gas through Atomic Layer Deposition method, the MOCVD method or photo-MOCVD method. The ratio of Ga(CH$_3$)$_3$ gas to Al(CH$_3$)$_3$ gas to form an intermediate layer of Ga$_{0.5}$Al$_{0.5}$AS is 1:1 but variation of the gas ratio can change the ratio of Ga to Al other than the ratio of 1:1 and any Ga$_x$Al$_{1-x}$As intermediate layer can be formed based on the ratio of Ga(CH$_3$)$_3$ gas to Al(CH$_3$)$_3$ gas. Subsequently, Al (CH$_3$)$_3$ gas and AsH$_3$ gas are used to form a shell layer of AlAs.

Triple-Layered Semiconductor Nanorod

The triple-layered semiconductor nanorods of the invention have a structure comprised of a core layer and a shell layer provided therebetween with an intermediate layer. The average diameter of the section of the triple-layer semiconductor nanorods is within the range of 2 to 50 nm, and preferably within the range of 2 to 10 nm. Falling above the lower limit of the foregoing range forms a structure of atoms being assembled, causing a band gap; falling below the upper limit of the range results in abruptly enhanced emission efficiency due to the confinement effect of an exciton (a pair of an electron and a hole).

The core layer, the shell layer and the intermediate layer are formed of different crystals. Such crystals are chosen so that the band gap of the crystal forming the shell layer is greater than that of the crystal forming the core layer. Examples of such a core/shell include GaAs/AlAs, GaN/AlN and GaP/AlP.

The lattice constant of a crystal forming an intermediate layer preferably is a value between the lattice constant of the crystal forming a core layer and that of the crystal forming a shell layer.

The triple-layer semiconductor nanorods of the invention are featured in enhanced emission efficiency and longer life on continuous emission, compared to conventional core/shell type semiconductor nanoparticles.

The reason therefor is not clear but it is assumed that providing an intermediate layer having a lattice constant between core and shell layers results in enhanced compatibility of lattice, leading to a tendency of reduced lattice defects, whereby emission characteristics inherent to nanorods are fully realized.

With respect to the core layer, intermediate layer and shell layer of the triple-layered semiconductor nanorods of the invention are preferred embodiments described in the afore-described triple-layered semiconductor nanoparticles. Thus, based on the same reason are preferred triple-layered semiconductor nanorods in which a core layer is formed of a crystal of composition AB, a shell layer is formed of composition CB and an intermediate layer is formed of a crystal of composition A$_x$C$_{1-x}$B; triple-layered semiconductor nanorods in which crystals forming a core layer, a shell layer and an intermediate layer belong to the same crystal system; and triple-layered semiconductor nanorods in which the difference in lattice constant between a core layer forming crystal and a shell layer forming crystal is within 3%.

The emission wavelength of the triple-layered nanorods of the invention depends on its composition or diameter. For example, a core of GaN exhibits emission wavelengths having a peak at a wavelength of 370-180 nm on the assumption of no energy loss in the emission process; a core of GaAs exhibits emission wavelengths having a peak at a wavelength of 870-430 nm on the assumption of no energy loss in the emission process; a core of GaP exhibits emission wavelengths having a peak at a wavelength of 550-270 nm on the assumption of no energy loss in the emission process; and a core of GaSb exhibits emission wavelengths having a peak at a wavelength of 1770-890 nm on the assumption of no energy loss in the emission process.

As is emitted at the foregoing wavelengths, a core of GaN is applicable to a violet emission device or emission labeling, and specifically to therapy for the affected area by exposure to UV emission; a core of GaAs, which emits in the region of red to violet and can cover all of three emissions of red, green and blue, is usable for displays and the like; a core of GaP is applicable to a violet emission device or emission labeling, and specifically to therapy for the affected area by exposure to UV emission; and a core of GaSb emits infrared light which can easily penetrate the human body, is usable for labeling for physiological diagnosis.

Preparation of Triple-Layered Semiconductor Nanorod

Triple-layered semiconductor nanorods of, for example, GaN/Ga$_{0.5}$Al$_{0.5}$N/AlN is prepared in the manner as follows. First, a GaN nanowire is formed on an insulating substrate through the CVD method using a Au catalyst. Then, using Al(CH3)3, Ga(CH3)3 and NH$_3$ gases, a Ga$_{0.5}$Al$_{0.5}$ intermediate layer formed of a few-atomic layer is formed through the Atomic Layer deposition method, the MOCVD method or the photo-MOCVD method. The ratio of Ga(CH$_3$)$_3$ and Al(CH$_3$)$_3$ to the Ga$_{0.5}$Al$_{0.5}$N intermediate layer is 1:1 but any variation of the gas ratio can change the ratio of Ga to Al other than the ratio of 1:1 and any Ga$_x$Al$_{1-x}$N intermediate layer can be formed based on the ratio of Ga (CH$_3$)$_3$ gas to Al (CH$_3$)$_3$ gas. Subsequently, Al(CH$_3$)$_3$ gas and NH$_3$ gas are used to form a shell layer of AlN.

EXAMPLES

The present invention will be further described with reference to examples but the invention is by no means limited to these.

Example 1

Using GaCl, Na—K (sodium-potassium alloy), powdery As, methoxyethyl ether, octadecane thiol (ODT), triethylamine, toluene and water, GaAs nanoparticles were formed through the following solution reaction [Literature: J. Luo et al., Mater. Res. Soc. Symp. Proc. Vol. 828 (2005) A5.20.1]:

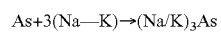

As+3(Na—K)→(Na/K)$_3$As

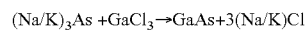

(Na/K)$_3$As +GaCl$_3$→GaAs+3(Na/K)Cl

There were obtained GaAs nanoparticles having a diameter of 2-5 mm by this method, as described in the literature.

The thus obtained GaAs nanoparticles (1) were immersed into a solution of surfactant Tween 80 to give hydrophilicity to the particle surface. Thereby, the GaAs particles were hydrophilized (hereinafter, also denoted as hydrophilic GaAs nanoparticles).

Subsequently, as shown in FIG. 1(a), using a vaporizer 5, hydrophilic GaAs nanoparticles were atomized by ultrasonics, which were vaporized in the vaporizer 5 with allowing He gas to flow (that is, in the state of GaAs nanoparticles covered with Tween 80 being floated in the He gas), whereby the GaAs nanoparticles (1) are introduced with He gas as a carrier into a reaction chamber 4 of a CVD apparatus. Then, raw material gases Ga(CH$_3$)$_3$, Al(CH$_3$)$_3$ and AsH$_3$ to form a Ga$_{0.5}$Al$_{0.5}$As layer were introduced into the reaction chamber 4. The reaction chamber is maintained at a temperature of ca. 600° C. and a pressure of ca. 1333 Pa. Introduction of this condition is a region of Ga(CH$_3$)$_3$, Al(CH$_3$)$_3$ and AsH$_3$ being barely reacted. Tween 80 is detached from the GaAs surface at such a high temperature. Subsequently, laser light 9 of excimer laser was irradiated from the outside of the reaction chamber, causing a reaction only in the region subjected to laser light energy to form a Ga$_{0.5}$Al$_{0.5}$As layer 3 around the GaAs nanoparticle (1). After passing through the laser irradiation section, no more reaction occurred without being exposed to energy necessary to cause the reaction. Finally, the thus formed GaAs/Ga$_{0.5}$Al$_{0.5}$As nanoparticles (2) were introduced with He gas into a surfactant Tween 80 solution and collected by a collector 6. Thus, hydrophilic GaAs/Ga$_{0.5}$Al$_{0.5}$As nanoparticles were obtained.

Subsequently, as shown in FIG. 1(b), thus obtained hydrophilic GaAs/Ga$_{0.5}$Al$_{0.5}$As nanoparticles (2) were immersed into water, bubbled and vaporized by the vaporizer 5, whereby the GaAs/Ga$_{0.5}$Al$_{0.5}$As nanoparticles were introduced with He gas as a carrier into a reaction chamber 4 of a CVD apparatus. Then, to the reaction chamber 4 were introduced raw material gases Al(CH$_3$)$_3$ and AsH$_3$ to form an AlAs layer. The reaction chamber was maintained at a temperature of ca. 600° C. and a pressure of ca. 1333 Pa. Introduction of this condition is a region of Al(CH$_3$)$_3$ and AsH$_3$ being barely reacted. Tween 80 is detached from the GaAs surface at such a high temperature. Subsequently, laser light 9 of excimer laser is irradiated from the outside of the reaction chamber, causing reaction only in the region subjected to laser light energy to form a AlAs layer 7 around the GaAs/Ga$_{0.5}$Al$_{0.5}$As nanoparticle. Thus, GaAs/Ga$_{0.5}$Al$_{0.5}$As/AlAs nanoparticles (8) are formed. After being passed through the laser irradiation section, no more reaction occurred as energy necessary to cause reaction being lessened. Finally, the thus formed GaAs/Ga$_{0.5}$Al$_{0.5}$As/AlAs nanoparticles were collected by a collector 6.

According to the foregoing preparation method, there were formed GaAs/Ga$_{0.5}$Al$_{0.5}$As/AlAs nanoparticles having a triple-layer structure. The obtained GaAs/Ga$_{0.5}$Al$_{0.5}$As/AlAs nanoparticles were exposed to a 365 nm light to determine emission intensity and emission life by a luminance meter. It was proved that the triple-layered GaAs/Ga$_{0.5}$Al$_{0.5}$As/AlAs nanoparticles resulted in improvements in emission intensity by a factor of 1.3 and emission life by a factor of 2.5, compared to GaAs/AlAs nanoparticles in which AlAs was formed on GaAs particles without undergoing the step of forming a Ga$_{0.5}$Al$_{0.5}$As layer.

Example 2

First, Ga nanoparticles were formed through a spray method and heated in a NH$_3$ atmosphere to obtain GaN nanoparticles having a diameter of 2-5 nm.

GaN/Ga$_{0.5}$Al$_{0.5}$N/AlN nanoparticles having a triple-layer structure were prepared similarly to Example 1, provided that GaAs nanoparticles were replaced by GaN nanoparticles and AsH$_3$ was replaced by NH$_3$. The thus prepared GaN/Ga$_{0.5}$Al$_{0.5}$N/AlN nanoparticles were exposed to 365 nm light to determine emission intensity and emission life by a luminance meter. It was proved that the triple-layered GaN/Ga$_{0.5}$Al$_{0.5}$N/AlN nanoparticles resulted in improved emission intensity by a factor of 1.2 and emission life by a factor of 1.8, compared to GaN/AlN nanoparticles in which AlN was formed on GaN particles without undergoing the step of forming a Ga$_{0.5}$Al$_{0.5}$N layer.

Example 3

First, using GaCl, Na—K (sodium-potassium alloy), powdery P, methoxyethyl ether, octadecane thiol (ODT), triethylamine, toluene and water, GaP nanoparticles were formed through the following solution reaction:

$$P + 3(Na-K) \rightarrow (Na/K)_3P$$

$$(Na/K)_3P + GaCl_3 \rightarrow GaP + 3(Na/K)Cl$$

There were obtained GaP nanoparticles having a diameter of 2-5 mm by this method.

GaP/Ga$_{0.5}$Al$_{0.5}$P/AlP nanoparticles having a triple-layer structure were prepared similarly to Example 1, provided that GaAs nanoparticles were replaced by GaP nanoparticles and AsH$_3$ was replaced by PH$_3$. The thus prepared GaP/Ga$_{0.5}$Al$_{0.5}$P/AlP nanoparticles were exposed to 365 nm light to determine emission intensity and emission life by a luminance meter.

It was proved that the triple-layered GaP/Ga$_{0.5}$Al$_{0.5}$P/AlP nanoparticles resulted in improved emission intensity by a factor of 1.4 and emission life by a factor of 1.5, compared to GaP/AlP nanoparticles in which AlP was formed on GaN particles without undergoing the step of forming a Ga$_{0.5}$Al$_{0.5}$P layer.

Example 4

First, using GaCl, Na—K (sodium-potassium alloy), powdery Sb, methoxyethyl ether, octadecane thiol (ODT), triethylamine, toluene and water, GaSb nanoparticles were formed through the following solution reaction:

$$Sb + 3(Na-K) \rightarrow (Na/K)_3Sb$$

$$(Na/K)_3Sb + GaCl_3 \rightarrow GaSb + 3(Na/K)Cl$$

There were obtained GaSb nanoparticles having a diameter of mm by this method.

GaSb/Ga$_{0.5}$Al$_{0.5}$Sb/AlSb nanoparticles having a triple-layer structure were prepared similarly to Example 1, provided that GaAs nanoparticles were replaced by GaSb nanoparticles and AsH$_3$ was replaced by SbH$_3$. The thus prepared GaSb/Ga$_{0.5}$Al$_{0.5}$Sb/AlSb nanoparticles were exposed to 365 nm light to determine emission intensity and emission life by a luminance meter. It was proved that the triple-layered GaSb/Ga$_{0.5}$Al$_{0.5}$Sb/AlSb nanoparticles resulted in improved emission intensity by a factor of 1.5 and emission life by a factor of 1.2, compared to GaSb/AlSb nanoparticles in which AlSb was formed on GaSb particles without performing the step of forming a Ga$_{0.5}$Al$_{0.5}$Sb layer.

Example 5

Figure 2:
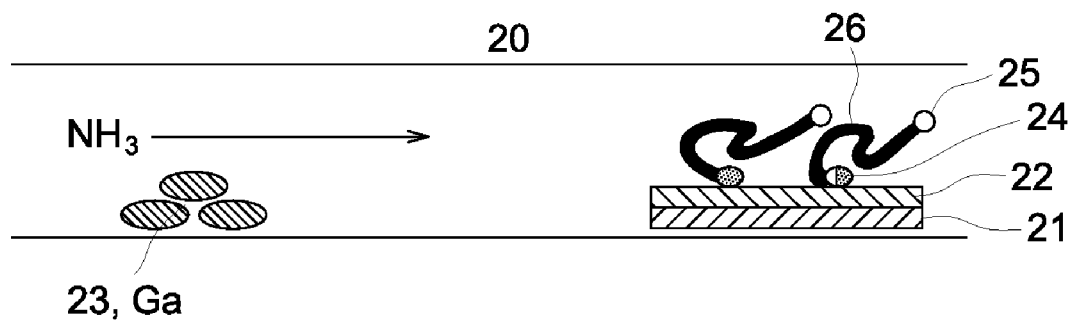
FIG. 2 illustrates the process of preparing $GaN/Ga_{0.5}Al_{0.5}N/AlN$.
Figure 2:
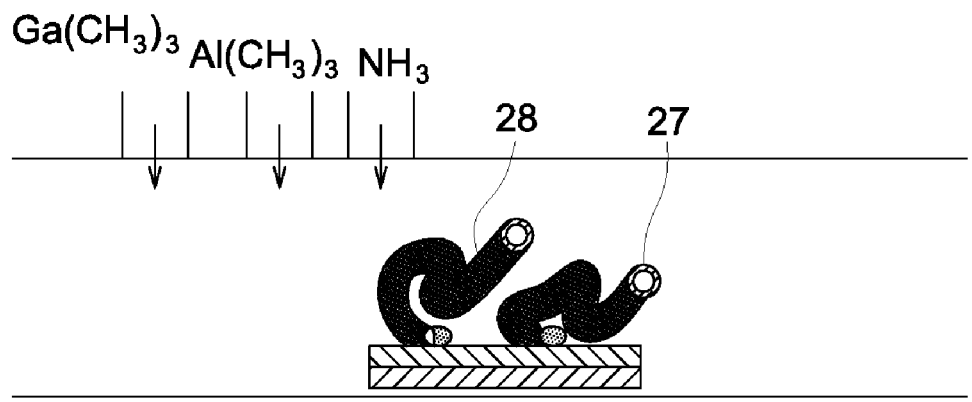
Figure 2:
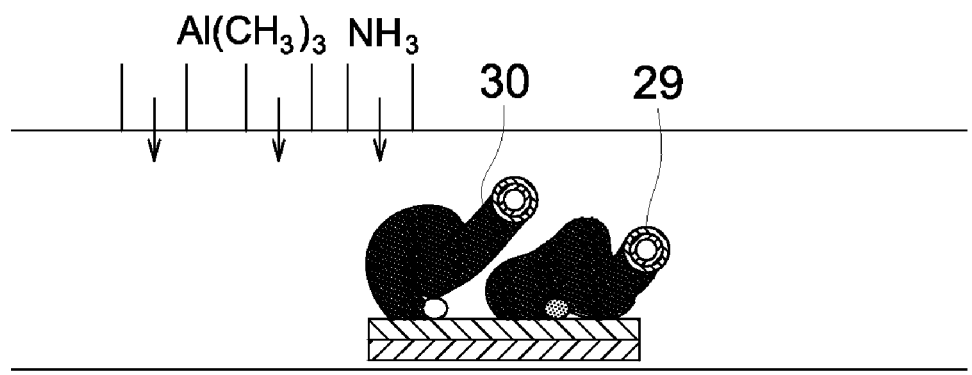

First, on a Si substrate having deposited 10 nm SiO$_2$ 22, Au nanoparticles (24) were coated by a coating method, as shown in FIG. 2(a). This was placed in a reaction chamber 20 formed of a quartz tube, and ca. 3 mm apart therefrom, Ga particles (23), NH$_3$ was flown at 30 sccm and the temperature was maintained at 900° C., whereby GaN nanowire was formed [Literature: S. Han et al., Mater. Res. Soc. Symp. Proc, Vol. 1776 (2003) Q8.26.1].

Subsequently, as shown in FIG. 2(b), the thus obtained substrate attached with GaN nanowires was placed in a reaction chamber 20 of a CVD apparatus. Then, raw material gases Ga(CH$_3$)$_3$, Al(CH$_3$)$_3$ and NH$_3$ to form a Ga$_{0.5}$Al$_{0.5}$N layer were introduced into the reaction chamber. The reaction chamber was maintained at a temperature falling within the range of Al(CH$_3$)$_3$ and AsH$_3$ being reacted, for example, 700° C. and ca. 1333 Pa. As a result, a Ga$_{0.5}$Al$_{0.5}$N layer was grown on the GaN nanowire through the CVD reaction. The amount of gases and reaction time were controlled so that the thickness of a Ga$_{0.5}$Al$_{0.5}$N layer 27 was from a layer of a few atoms to ca. 1 mm. Although not shown in the FIG., a Ga$_{0.5}$Al$_{0.5}$N layer was formed SiO$_2$ 22. This was not essential and is not shown in the FIG.

Then, as shown in FIG. 2(c), raw material gases Al(CH$_3$)$_3$ and NH$_3$ to form an AlN layer were introduced into the reaction chamber of a CVD apparatus. The reaction chamber was maintained at a temperature of 700° C. and a pressure of 1333 Pa. As a result, an AlN layer 29 was grown on the GaN/Ga$_{0.5}$Al$_{0.5}$N nanowire 28. There was thus formed a GaN/Ga$_{0.5}$Al$_{0.5}$N/AlN nanowire 30. Although not shown in the FIG., an AlN layer 29 is formed on the SiO$_2$ layer 22. This was not essential and is not shown in the FIG.

The thus formed nanowires were immersed in a Tween 80 to be subjected to a hydrophilization treatment, as described earlier and separated from the Si substrate with applying ultrasonic.

In the nanowire structure, 1000 of 10 nm long nanoparticles are to be linked in the length direction, leading to advantages that its lightness is approximately 1,000 times that of a single nanoparticle.

According to the foregoing method, there were formed GaN/Ga$_{0.5}$Al$_{0.5}$N/AlN nanorods having a triple-layered structure. The thus prepared GaN/Ga$_{0.5}$Al$_{0.5}$N/AlN nanorods were exposed to a 365 nm light to determine emission intensity and emission life by a luminance meter. It was proved that the triple-layered GaN/Ga$_{0.5}$Al$_{0.5}$N/AlN nanorods resulted in improvements in emission intensity by a factor of 1.2 and emission life by a factor of 2.0, compared to GaN/AlN nanorods in which AlN was formed on GaN rods without undergoing the step of forming a Ga$_{0.5}$Al$_{0.5}$N layer.

Example 6

GaAs/Ga$_{0.5}$Al$_{0.5}$As/AlAs nanorods were prepared similarly to Example 1, provided that NH$_3$ was replaced by ASH$_3$ and the condition of nanowire preparation was changed to 40 sccm and 900° C.

The thus prepared GaAs/Ga$_{0.5}$Al$_{0.5}$As/AlAs nanorods were exposed to 365 nm light to determine emission intensity and emission life by a luminance meter. It was proved that the triple-layered GaAs/Ga$_{0.5}$Al$_{0.5}$As/AlAs nanorods resulted in improved emission intensity by a factor of 1.3 and emission life by a factor of 1.4, compared to GaAs/AlAs nanorods in which AlAs was formed on GaAs rods without undergoing the step of forming a Ga$_{0.5}$Al$_{0.5}$As layer.

Example 7

GaP/Ga$_{0.5}$Al$_{0.5}$P/AlP nanorods were prepared similarly to Example 1 provided that NH$_3$ was replaced by PH$_3$ and the condition of nanowire preparation was changed to 40 sccm and 900° C. and the subsequent reaction chamber condition was maintained at a temperature of 800° C. and a pressure of 1333 Pa.

The thus prepared GaP/Ga$_{0.5}$Al$_{0.5}$P/AlP nanorods were exposed to 365 nm light to determine emission intensity and emission life by a luminance meter. It was proved that the triple-layered GaP/Ga$_{0.5}$Al$_{0.5}$P/AlP nanorods resulted in improvements in emission intensity by a factor of 1.3 and emission life by a factor of 1.4, compared to GaP/AlP nanorods in which AlP was formed on GaP rods without undergoing the step of forming a Ga$_{0.5}$Al$_{0.5}$P layer.

Example 8

GaSb/Ga$_{0.5}$Al$_{0.5}$b/AlSb nanorods were prepared similarly to Example 5, provided that NH$_3$ was replaced by SbH$_3$ and the condition of the reaction chamber after nanowire preparation was maintained at a temperature of 800° C. and a pressure of 1333 Pa.

The thus prepared GaSb/Ga$_{0.5}$Al$_{0.5}$Sb/AlSb nanorods were exposed to 365 nm light to determine emission intensity and emission life by a luminance meter. It was proved that the triple-layered GaSb/Ga$_{0.5}$Al$_{0.5}$Sb/AlSb nanorods resulted in improvements in emission intensity by a factor of 1.5 and emission life by a factor of 1.2, compared to GaSb/AlSb nanorods in which AlSb was formed on GaSb rods without undergoing the step of forming a Ga$_{0.5}$Al$_{0.5}$Sb layer.

What is claimed is:

1. Triple-layered semiconductor nanoparticles comprising a core layer, an intermediate layer and a shell layer and having an average particle diameter of 2 to 50 nm,
   the core, intermediate and shell layers being formed of different crystals,
   a crystal forming the shell layer having a band gap greater than that of a crystal forming the core layer, and
   a lattice constant of a crystal forming the intermediate layer being a value falling between a lattice constant of the crystal forming the core layer and that of the crystal forming the shell layer
   wherein when a composition of the crystal forming the core layer is represented by AB and a composition of the crystal forming the shell layer is represented by CB, a composition of the crystal forming the intermediate layer is represented by A$_x$C$_{1-x}$B, wherein A, B, and C are different elements; and X is a value falling within a range of 0<X<1.

2. The triple-layered semiconductor nanoparticles of claim 1, wherein the composition of the crystal forming the core layer is represented by GaAs, the composition of the crystal forming the shell layer is represented by AlAs and the composition of the crystal forming the intermediate layer is represented by Ga$_{0.5}$Al$_{0.5}$As.

3. The triple-layered semiconductor nanoparticles of claim 1, wherein the composition of the crystal forming the core layer is represented by GaN, the composition of the crystal forming the shell layer is represented by AlN and the composition of the crystal forming the intermediate layer is represented by Ga$_{0.5}$Al$_{0.5}$N.

4. The triple-layered semiconductor nanoparticles of claim 1, wherein the composition of the crystal forming the core layer is represented by GaP, the composition of the crystal forming the shell layer is represented by AlP and the composition of the crystal forming the intermediate layer is represented by Ga$_{0.5}$Al$_{0.5}$P.

5. The triple-layered semiconductor nanoparticles of claim 1, wherein the composition of the crystal forming the core layer is represented by GaSb, the composition of the crystal forming the shell layer is represented by AlSb and the composition of the crystal forming the intermediate layer is represented by Ga$_{0.5}$Al$_{0.5}$Sb.

6. The triple-layered semiconductor nanoparticles of claim 1, wherein a difference between a lattice constant of the crystal forming the core layer and that of the crystal forming the shell layer is not more than 3%.

7. Triple-layered semiconductor nanorods comprising a core layer, an intermediate layer and a shell layer and having an average rod diameter of 2 to 50 nm,
- the core, intermediate and shell layers being formed of different crystals,
- a crystal forming the shell layer having a band gap greater than that of a crystal forming the core layer, and
- a lattice constant of a crystal forming the intermediate layer being a value between a lattice constant of the crystal forming the core layer and that of the crystal forming the shell layer
- wherein when a composition of the crystal forming the core layer is represented by AB and a composition of the crystal forming the shell layer is represented by CB, a composition of the crystal forming the intermediate layer is represented by $A_xC_{1-x}B$, wherein A, B, and C are different elements; and X is a value falling within a range of 0<X<.

8. The triple-layered semiconductor nanorods of claim 7, wherein the composition of the crystal forming the core layer is represented by GaAs, the composition of the crystal forming the shell layer is represented by AlAs and the composition of the crystal forming the intermediate layer is represented by $Ga_{0.5}Al_{0.5}As$.

9. The triple-layered semiconductor nanorods of claim 7, wherein the composition of the crystal forming the core layer is represented by GaN, the composition of the crystal forming the shell layer is represented by AlN and the composition of the crystal forming the intermediate layer is represented by $Ga_{0.5}Al_{0.5}N$.

10. The triple-layered semiconductor nanorods of claim 7, wherein the composition of the crystal forming the core layer is represented by GaP, the composition of the crystal forming the shell layer is represented by AlP and the composition of the crystal forming the intermediate layer is represented by $Ga_{0.5}Al_{0.5}P$.

11. The triple-layered semiconductor nanorods of claim 7, wherein the composition of the crystal forming the core layer is represented by GaSb, the composition of the crystal forming the shell layer is represented by AlSb and the composition of the crystal forming the intermediate layer is represented by $Ga_{0.5}Al_{0.5}Sb$.

12. The triple-layered semiconductor nanorods of claim 7, wherein a difference between a lattice constant of the crystal forming the core layer and that of the crystal forming the shell layer is not more than 3%.

* * * * *